Figure 1:
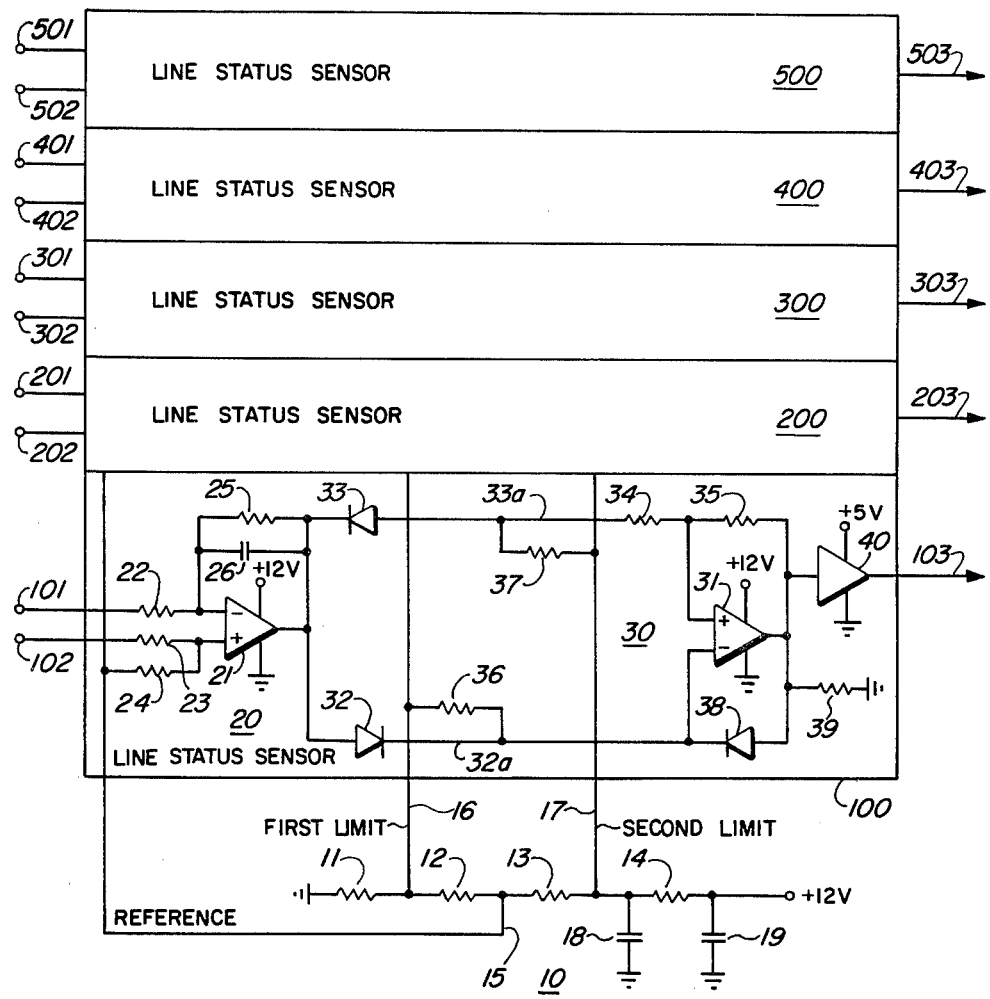

United States Patent [19]

Rosch

[11] 4,446,338

[45] May 1, 1984

[54] TELEPHONE LINES STATUS SENSOR

[75] Inventor: Reinhard W. Rosch, Richmond, Canada

[73] Assignee: Northern Telecom Limited, Montreal, Canada

[21] Appl. No.: 397,567

[22] Filed: Jul. 12, 1982

[51] Int. Cl.³ .............................................. H04Q 5/20
[52] U.S. Cl. ........................... 179/18 FA; 179/99 LC; 179/99 LS; 179/81 R
[58] Field of Search ............ 179/99 LC, 99 LS, 99 R, 179/84 L, 81 C, 18 FA, 18 F, 175.2 C, 81 R

[56] References Cited

U.S. PATENT DOCUMENTS 4,323,734  4/1982  Kimzey ......................... 179/99 LC Primary Examiner—Stafford D. Schreyer
Attorney, Agent, or Firm—J. E. Moorhouse

[57] ABSTRACT

A lines status sensor provides for monitoring of the operating status of one or more telephone lines at an associated telephone station apparatus. The lines status sensor includes a translation circuit being responsive to potential differences appearing across the telephone line, for generating a voltage signal of corresponding polarity in relation to a reference voltage. A voltage divider circuit provides the reference voltage in addition to a first limit voltage being of a more negative potential than the reference voltage, and a second limit voltage being more positive than the reference voltage. A detection circuit is responsive to the first and second limit voltages such that when the potential of the output voltage from the translation circuit is within a range as defined by the first and second limit voltages, an output signal of the detection circuit is of one binary state thereby indicating an OFF HOOK status of the telephone line, and when the potential is outside of the range the output signal is of another binary state thereby indicating an ON HOOK status of the telephone line. In a variation of the line status sensor a wider range is useful for detecting the presence of ringing signals on the telephone line.

14 Claims, 2 Drawing Figures

TELEPHONE LINES STATUS SENSOR

The invention is in the field of telephone station apparatus and more particularly the invention relates to monitoring of operational status of a telephone line connected to a telephone station apparatus.

Key telephone systems are typically provided on a lease basis to a subscriber by an operating telephone company. Historically the telephone company has insisted that any station apparatus being connected to key telephone lines shall also be supplied and connected by the telephone company. Presently however, a key telephone system subscriber is permitted to connect other station apparatus sometimes referred to as interconnect apparatus, providing that such station apparatus at least meets a functional specification as defined by a national regulating authority. For example, in the United States of America, the regulating authority is the Federal Communications Commission. In Canada, the regulating authority is the Department of Communications. Operating telephone companies are thereby substantially assured that interconnect apparatus meeting these specifications will not be of any detrimental effect.

In an instance of an interconnect station apparatus being connected to a telephone line, for example in a key telephone system, the station apparatus is required to be able to monitor the supervisory status of the telephone line. Supervisory status, ON HOOK and OFF HOOK, are manifest by corresponding greater and lesser potential differences being present between tip and ring leads in the telephone line. These potential differences may be of either forward or reverse polarities. Typically the ON HOOK status is indicated by an absolute potential difference of at least 40 volts, and the OFF HOOK status is indicated by an absolute potential difference of usually less than 24 volts. A lines status sensor in the interconnect station apparatus must be capable of distinguishing the ON HOOK status and the OFF HOOK status while imparting no significant loading effect upon the telephone line, for example as is required in accordance with the previously mentioned functional specifications. Furthermore, in the case of a plurality of interconnect station apparatus being coupled to the telephone line, as is typical in key telephone systems, the sum total of the loading of all the line status sensors must not exceed that defined in the functional specification. For example, if up to five line status sensors are connected along the telephone line, the input impedance of each line status sensor is preferably at least 50 megohms at each of the tip and ring leads.

Recent designs of interconnect telephone station apparatus, particularly those designs capable of a data communication function, include binary logic circuits energized from power and ground terminals of a simple mains power supply. It is preferable that a line status sensor in the interconnect telephone station apparatus will have a binary logic circuit compatible output, and be operable from the same power supply.

It is an object of the invention to provide a line status sensor for use in a station set such that the line monitoring requirements of said specifications are met.

It is also an object of the invention that a plurality of up to five of the line status sensors be connectable along a telephone line with the combined total loading effect of same being within the requirements of said specifications.

A line status sensor in accordance with the invention includes a first circuit for generating a reference voltage and first and second limit voltages of negative and positive polarities respectively in relation to the reference voltage. A translation circuit is responsive to forward and reverse potential differences appearing across a pair of line terminals and to the reference voltage, for generating a correspondingly proportional voltage signal of corresponding polarity in relation to the reference voltage. A detection circuit generates an output signal being of one binary state in response to the voltage signal from the translation circuit being outside of a range defined in relation to the first and second limit voltages. The detection circuit generates the output signal being of another binary state in response to the voltage signal being within the defined range. The output signal is useful in an associated telephone station apparatus as an indication of ON HOOK and OFF HOOK conditions of a telephone line connected at the pair of line terminals.

A plurality of the translation and detection circuits in combination with the first circuit and corresponding pairs of line terminals provide a lines status sensor useful for monitoring the ON HOOK and OFF HOOK conditions at each of the pairs of line terminals.

In an alternate configuration of the line status sensor, the first circuit is adapted to generate third and fourth limit voltages in addition to the reference voltage and the first and second limit voltages. A second detection circuit similar to the last mentioned detection circuit is responsive to the third and fourth limit voltages and the voltage signal from the translation circuit, for detecting potential excursion at the line terminal which are in excess of typical d.c. energizing potentials and are consistent with an application of ringing signals to the telephone line.

A method, in accordance with the invention for generating a supervisory status logic signal for use in a telephone station apparatus connected to a telephone line, includes the steps of generating a reference voltage and one and another limit signals having negative and positive potentials with respect to the reference voltage. Forward and reverse potential differences, appearing across a pair of leads in the telephone line are translated into a voltage signal of corresponding polarity in relation to the reference voltage. A supervisory status logic signal is generated with one of two binary signal states in response to the voltage signal being outside of a range being defined in relation to the first and second limit signals and is generated with the other of the two binary signal states in response to the voltage signal being within the defined range.

Figure 2:
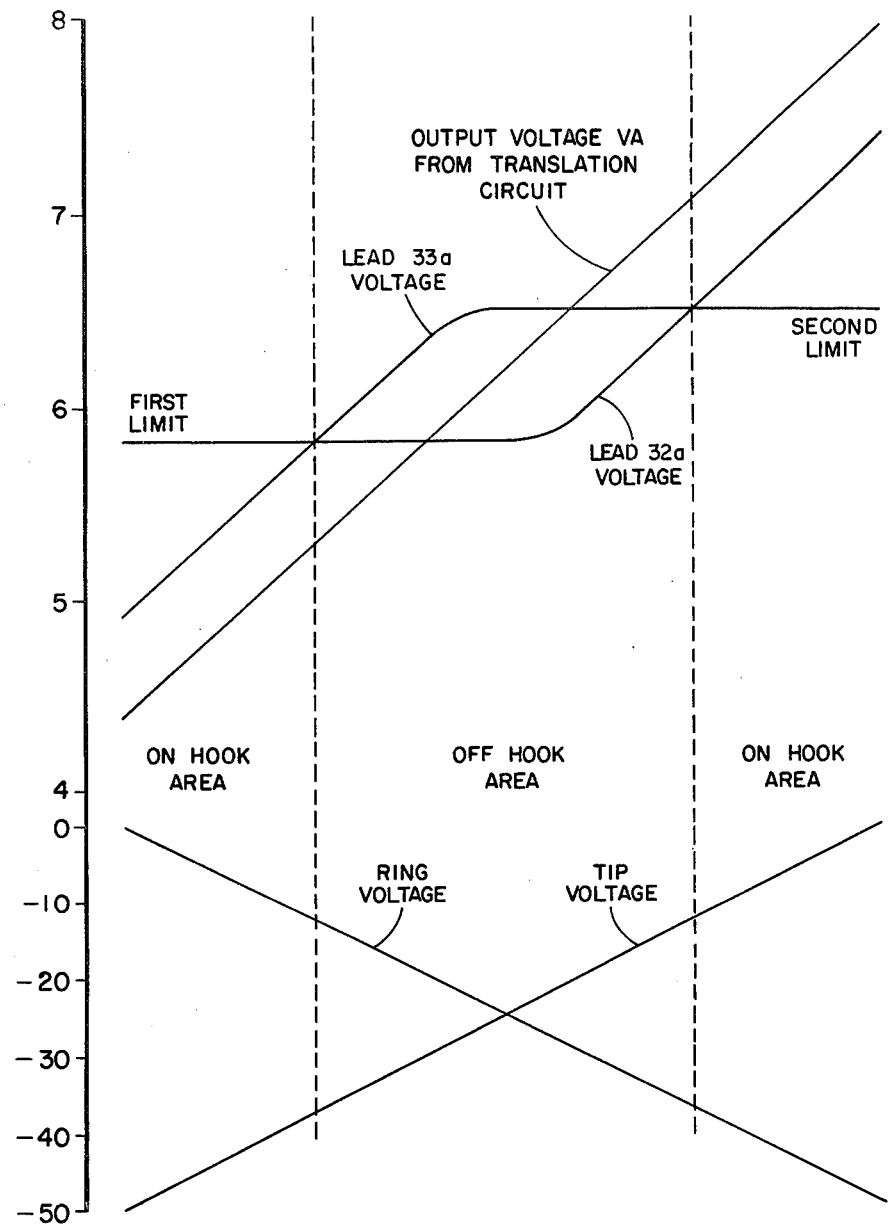

An example embodiment is described with reference to the accompanying drawings in which:

FIG. 1 is a schematic diagram of a lines status sensor for use with up to five telephone lines, in accordance with the invention; and FIG. 2 is a graphical representation of operating characteristics of a lines status sensor in FIG. 1.

The lines status sensor in FIG. 1 is intended for use in a station apparatus being suitable for connection with one or more telephone lines. The lines status sensor provides for ON HOOK and OFF HOOK line status detection in relation to the one or more telephones lines, while having an insignificant loading effect. Signals developed within the line status sensor in response to ringing signals in the one or more telephone lines are optionally useful for detection of the ringing signals.

The lines status sensor in FIG. 1 includes five line status sensors 100, 200, 300, 400 and 500 connected to a voltage divider at 10. The line status sensor 100 is illustrated in detail and is exemplary of the line status sensors 200-500. The line status sensor 100 includes line terminals 101 and 102 for connection across a two wire telephone line, and an output line 103 for coupling TTL compatible signals indicative of the telephone line status to logic circuitry in the station apparatus. The line status sensors 200-500 each have correspondingly labelled line terminals (201, 202-501, 502) and output lines (203-503). For consistency in the description, it is assumed that the terminal 101 is a tip terminal which is normally connected to a corresponding tip wire in the telephone line and that the terminal 102 is a ring terminal which is normally connected to a corresponding ring wire in the telephone line. However, as will become evident, this connection is interchangeable with no consequence to the line status detection function.

Considering the structure of the line status sensor 100, it includes a translation circuit, illustrated at 20, coupled to a detection circuit, illustrated at 30. The translation circuit is connected to receive a reference voltage from the voltage divider at 10, and the detection circuit is connected to receive first and second limit voltages from the voltage divider at 10.

The voltage divider in this example includes resistors 11, 12, 13 and 14 being connected in series from between ground and a power terminal labelled +12 V. The reference voltage is supplied on a lead 15 from a junction of the resistors 12 and 13. The first limit voltage is supplied, having a potential more negative than that of the reference voltage, on a lead 16 from a junction of the resistors 11 and 12. The second limit signal is supplied, having a potential more positive than the reference voltage, on a lead 17 from a junction of the resistors 13 and 14. Capacitors 18 and 19 connected as shown, provide a filter function to remove a.c. noise signals which may be present at the power terminal +12 V.

The translation circuit at 20 includes a differential amplifier 21 having an inverting input connected in series with a resistor 22 to the line terminal 101, and a non inverting input connected in series with a resistor 23 to the line terminal 102. The non inverting input is also connected in series with a resistor 24 to the lead 15. A resistor 25 is connected in parallel with a capacitor 26 between the inverting input and an output of the differential amplifier 21. The resistors 22 and 23 are preferably matched to a tolerance of within plus and minus one percent and in this example have ohmic values in a range of about 50 to 52 megohms. The resistors 24 and 25 are also preferably matched to a tolerance of within plus and minus one percent. These tolerances are not essential but are preferred for consistent operation in a line status sensor. In this example ohmic values were chosen such that a ratio of the ohmic values of the resistor 22 and the resistor 25 is about 28 to 1. This ratio determines the gain of the translation circuit and insures that the differential amplifier 21 will operate well within its linear range for ON HOOK telephone line voltages of either forward or reverse polarities. In addition, a large ratio and 1 percent component tolerances, as in this example, are of benefit to the in circuit common mode rejection characteristics of the differential amplifier 21, particularly if the amplifier is chosen to have input impedances similar to those characteristic of field effect devices. For example, differential amplifiers available with product code LF347 have been found to be suitable.

The detection circuit at 30 includes a differential amplifier 31 having an inverting input connected via a lead 32a to a cathode of a diode 32, the anode of which is connected to the output of the differential amplifier 21. The differential amplifier 31 also has a non inverting input connected in series with a resistor 34, which is connected via a lead 33a to an anode of a diode 33, the cathode of which is connected to the output of the differential amplifier 21. A resistor 35 is connected between the non inverting input and an output of the differential amplifier 31. The output of the differential amplifier 31 is also connected in series with a resistor 39 to ground, and connected to an anode of a diode 38, the cathode of which is connected to the inverting input of the differential amplifier 31.

A buffer amplifier 40 is connected in series with the output of the differential amplifier 31 to provide adequate current on the lead 103 to satisfy a broad spectrum of load current requirements as might be found in various station apparatus.

The differential amplifiers 21 and 31 and the voltage divider are conveniently powered from a power source, not shown, having an output potential in a range of between about 12 and 12.5 volts. The buffer amplifier is intended to be powered from a power source, typically a 5 volt supply, not shown, which is common to logic circuits in the associated station apparatus.

Operation of the line status sensor 100 is discussed with reference to FIG. 2 wherein a voltage scale at the left hand side of the figure includes upper and lower portions. The upper portion is a linear scale representing a range of from four to eight volts. The lower portion is a linear scale representing a range of from zero to minus fifty volts. Tip and ring voltages as typically appearing across the tip and ring leads of a telephone line adjacent a station apparatus are shown in reference to the lower scale. Corresponding output voltages (VA) generated by the translation circuit are represented by a line VA shown in reference to the upper scale and the tip and ring voltages. Lines representing voltages occurring on the leads 32a and 33a in the detection circuit are also shown in reference to the upper scale. Potential differences of about 33 volts and less appearing across the tip and ring leads correspond to an OFF HOOK condition which is represented by an area lying between a pair of vertical dotted lines extending between areas to the right of the upper and lower portions. The remaining areas are representative of an ON HOOK condition which corresponds to potential differences of more than the 33 volts between the tip and ring leads.

In operation the difference between the tip voltage appearing at the terminal 101 and the voltage at the output of the differential amplifier 21 is divided across the resistors 22 and 25. Ring voltages appearing at the terminal 102 are referenced with respect to the reference voltage on the lead 15 and are divided across the resistors 23 and 24. The differential amplifier 21 responds to these voltages by generating a translated voltage VA, at its output, being of a potential to adjust the voltage at the junction of the resistors 25 and 22 to be very close if not equal to the voltage at the junction of the resistors 23 and 24. In the case where the resistors 22 and 23 are each 50 megohms and the resistors 24 and 25 are each 1.8 megohms, the translated voltage VA corresponds to the voltage VA illustrated in FIG. 2.

The detection circuit responds to the translated voltage VA at the output of the differential amplifier 21 in accordance with the potentials of the first and second limit voltages and the conduction characteristics of the diodes 32 and 33. Diodes of the silicon semiconductor type are generally suitable however diodes of other semiconductor materials may well be used providing that either the first and second limit voltages or the response characteristics of the translation are altered to compensate for the various different semiconductor forward conduction voltage drops. In the ON HOOK condition the voltage on the lead 33a is less than the voltage on the lead 32a and hence the output of the differential amplifier 31 is near ground potential. In the OFF HOOK condition the voltage on the lead 33a is greater than the voltage on the lead 32a and hence the output of the differential amplifier is positive high. Due to the gating action of the diodes 32 and 33, the lowest voltage on the lead 32a corresponds to the potential of the first limit signal on the lead 16, and the highest voltage on the lead 33a corresponds to the potential of the second limit signal on the lead 17. The resistors 34 and 35 are not essential to the operation of the detection circuit. These elements are used to provide a minor hysterisis characteristic in the response of the detection circuit and thereby prevent any tendency toward oscillation which might otherwise occur at or near a 33 volt potential difference being present between the terminals 101 and 102. Resistance values of about 5 Kohms and 1 Mohms in the example embodiment have been found to provide about 1 to 2 volts of hysteresis with respect to voltages between the terminals 101 and 102. This hysterisis is not illustrated in FIG. 2. The diode 38 is used as a convenient means to provide negative feed back such that when the output of the differential amplifier 31 is high, it is limited to a potential one diode forward voltage drop above the potential on the lead 32a, that is a potential substantially compatible with a low level logic signal input of the buffer amplifier 40.

As before mentioned signals potentially useful for detection of ringing signals are generated in the line status sensor in response to an application of ringing signals to the telephone line. In the presence of ringing signals, the differential amplifier 21 produces output voltages which greatly exceed the range of voltages illustrated by the line VA in FIG. 2. One suitable ringing detector includes a detection circuit similar to the detection circuit at 30 however being supplied with limit signals for example of 4 and 8.5 volts respectively. Transitions in the output signal of the ringing detection circuit are useful to verify the presence of applied ringing signals having a predetermined standard frequency of for example 20 Hz, 16 Hz etc.

What is claimed is:

1. A line status sensor for use in a telephone station apparatus including a pair of line terminals for connection to tip and ring leads of a telephone line, the line status sensor comprising:
    first and second power terminals for connection across a power source;
    first means being connected across the first and second power terminals, for generating a reference voltage, and first and second limit voltages of negative and positive polarities respectively in relation to the reference voltage;
    a translation circuit being responsive to forward and reverse potential differences appearing across the line terminals and to the reference voltage, for generating voltage signals of corresponding polarity in relation to the reference voltage;
    a detection circuit for generating an output signal being of one binary state in response to the voltage signal being outside of a range defined in relation to the first and second limit voltages, and for generating the output signal being of another binary state in response to the voltage signal being within said defined range, whereby said output signal is indicative of conditions of the telephone line.

2. A line status sensor as defined in claim 1 wherein one of said power terminals is for connection to a grounded terminal of the power source and wherein the first means comprises a voltage divider having a reference voltage tap, a first limit voltage tap, and second limit voltage tap at which said reference voltage and said first and second limit voltages are generated.

3. A line status sensor as defined in claim 1 wherein the translation circuit comprises;
    a differential amplifier having an output for providing said voltage signal, an inverting input being connected in series with a first resistor to one of the line terminals and being connected in series with a second resistor to the output, and a non inverting input being connected in series with a third resistor to the other of the line terminals and being resistively coupled, via a fourth resistor, with the reference voltage from the first means; and
    wherein ohmic values of the first and third resistors are similar, ohmic values of the second and fourth resistors are similar, and a ratio of the ohmic values of the first and second resistors is predetermined to define an operational gain of the differential amplifier such that a predetermined potential difference between the line terminals will cause said voltage signal to be generated having a potential corresponding to either of the limits of said defined range.

4. A line status sensor as defined in claim 1 wherein the detection circuit comprises:
    a differential amplifier having an output for providing said output signal, an inverting input being resistively coupled, via a fifth resistor, with the first limit voltage from the first means, a non inverting input being resistively coupled, via a sixth resistor, with the second limit voltage from the first means; and
    first and second unidirectionally conductive elements being connected in series aiding configuration between the inverting and non inverting inputs of the differential amplifier, and a junction of the first and second unidirectionally conductive elements being connected to receive the voltage signal from the translation circuit.

5. A line status sensor as defined in claim 4 wherein the detection circuit further comprises:
    a resistance network connected in combination with the differential amplifier for providing a hysterisis function in the operation of the detector circuit, the resistance network including a seventh resistor being connected between the output and the non inverting input of the differential amplifier, and an eighth resistor being connected in series with the non inverting input and a junction of the sixth resistor and the second unidirectionally conductive element.

6. A line status sensor as defined in claim 2 wherein the translation circuit comprises:

a differential amplifier having an output for providing said voltage signal, an inverting input being connected in series with a first resistor to one of the line terminals and being connected in series with a second resistor to the output, and a non inverting input being connected in series with a third resistor to the other of the line terminals and being resistively coupled, via a fourth resistor, with the reference voltage from the first means; and wherein ohmic values of the first and third resistors are similar, ohmic values of the second and fourth resistors are similar, and a ratio of the ohmic values of the first and second resistors is predetermined to define an operational gain of the differential amplifier such that a predetermined potential difference between the line terminals will cause said voltage signal to be generated having a potential corresponding to either of the limits of said defined range.

7. A line status sensor as defined in claim 2 wherein the detection circuit comprises:

a differential amplifier having an output for providing said output signal, an inverting input being resistively coupled, via a fifth resistor, with the first limit voltage from the first means, a non inverting input being resistively coupled, via a sixth resistor, with the second limit voltage from the first means; and first and second unidirectionally conductive elements being connected in series aiding configuration between the inverting and non inverting inputs of the differential amplifier, and a junction of the first and second unidirectionally conductive elements being connected to receive the voltage signal from the translation circuit.

8. A line status sensor as defined in claim 3 wherein the detection circuit comprises:

a differential amplifier having an output for providing said output signal, an inverting input being resistively coupled, via a fifth resistor, with the first limit voltage from the first means, a non inverting input being resistively coupled, via a sixth resistor, with the second limit voltage from the first means; and first and second unidirectionally conductive elements being connected in series aiding configuration between the inverting and non inverting inputs of the differential amplifier, and a junction of the first and second unidirectionally conductive elements being connected to receive the voltage signal from the translation circuit.

9. A lines status sensor for use in a telephone station apparatus including pairs of line terminals, each pair being for connection to tip and ring leads of one of a plurality of telephone lines, the lines status sensor comprising:

first and second power terminals for connection across a power source;

first means being connected across the first and second power terminals, for generating a reference voltage and first and second limit voltages of negative and positive polarities respectively in relation to the reference voltage;

a plurality of translation circuits, each translation circuit being responsive to forward and reverse potential differences appearing across a corresponding pair of the line terminals and to the reference voltage, for generating a correspondingly proportional voltage signal of corresponding polarity in relation to the reference voltage;

a plurality of detection circuits, each detection circuit being for generating an output signal being of one binary state in response to the voltage signal from a corresponding one of the translation circuits being outside of a range defined in relation to the first and second limit signals, and being for generating the output signal being of another binary state in response to said voltage signal being within said defined range, whereby said output signal is of ON HOOK and OFF HOOK condition of the telephone line connected with the corresponding pair of line terminals.

10. A lines status sensor as defined in claim 9 wherein one of said power terminals is for connection to a grounded terminal of the power source and wherein the first means comprises a voltage divider having a reference voltage tap, a first limit voltage tap, and a second limit voltage tap at which said reference voltage and said first and second limit voltages are generated.

11. A lines status sensor as defined in claim 9 wherein each of the plurality of translation circuits comprises:

a differential amplifier having an output for providing said voltage signal, an inverting input being connected in series with a first resistor to one of the line terminals and being connected in series with a second resistor to the output, and a non inverting input being connected in series with a third resistor to the other of the line terminals and being resistively coupled, via a fourth resistor, with the reference voltage from the first means; and wherein ohmic values of the first and third resistors are similar, ohmic values of the second and fourth resistors are similar, and a ratio of the ohmic values of the first and second resistors is predetermined to define an operational gain of the differential amplifier such that a predetermined potential difference between the line terminals will cause said voltage signal to be generated having a potential corresponding to either of the limits of said defined range.

12. A lines status sensor as defined in claim 9 wherein each of the plurality of detection circuits comprises:

a differential amplifier having an output for providing said output signal, an inverting input being resistively coupled, via a fifth resistor, with the first limit voltage from the first means, a non inverting input being resistively coupled, via a sixth resistor, with the second limit voltage from the first means; and first and second unidirectionally conductive elements being connected in series aiding configuration between the inverting and non inverting inputs of the differential amplifier, and a junction of the first and second unidirectionally conductive elements being connected to receive the voltage signal from the translation circuit.

13. A lines status sensor as defined in claim 12 wherein each of the plurality of detection circuits further comprises:

a resistance network connected in combination with the differential amplifier for providing a hysterisis function in the operation of the detector circuit, the resistance network including a seventh resistor being connected between the output and the non inverting input of the differential amplifier, and an eighth resistor being connected in series with the non inverting input and a junction of the sixth resistor and the second unidirectionally conductive element.

14. A method for generating a supervisory status logic signal for use in a telephone station apparatus being connected to at least one telephone line, comprising the steps of:

(a) generating a reference voltage and first and second limit voltage signals having negative and positive potentials with respect to the reference voltage;

(b) translating forward and reverse potential differences, appearing across a pair of leads in the telephone line, into a correspondingly proportional voltage signal of corresponding polarity in relation to the reference voltage; and (c) generating the supervisory status logic signal with one of two binary signal states in response to the voltage signal being outside of a range being defined in relation to the first and second limit signals, and generating the supervisory status logic signal with the other of the two binary signals stated in response to the voltage signal being within said defined range.

* * * * *